Oct. 22, 1940.   A. B. KEMPEL   2,218,680
FRICTION ELEMENT
Filed July 7, 1939
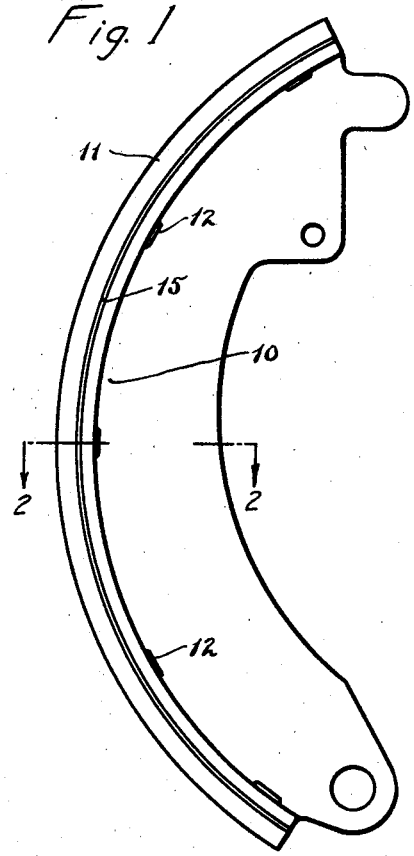
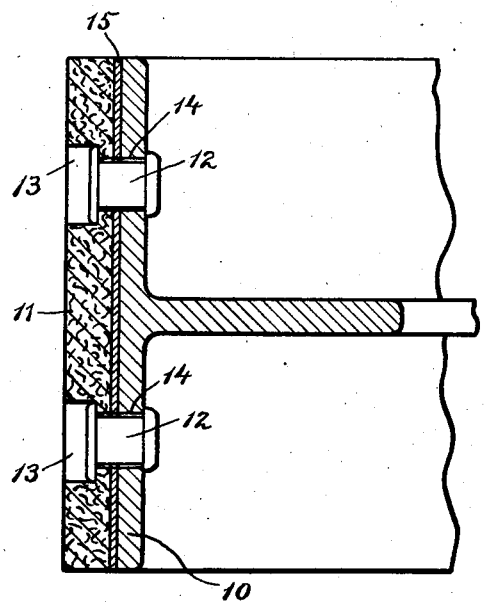
Inventor
A. B. Kempel,
By Robert M. Pierson,
Attorney Patented Oct. 22, 1940

2,218,680

UNITED STATES PATENT OFFICE 2,218,680

FRICTION ELEMENT

Arthur B. Kempel, East Brady, Pa., assignor to Rex-Hide, Incorporated, East Brady, Pa., a corporation of Pennsylvania Application July 7, 1939, Serial No. 283,236

2 Claims. (Cl. 188—234)

This invention relates to elements of friction couplings including brakes and analogous structures such as clutches. Its object is to provide an improved connection between the foundation member of such an element and the facing of friction material.

Brake shoes including a body or foundation member and a friction facing suitably attached thereto, as by riveting, are frequently kept in storage for a considerable time after assembling, before being installed in the brakes. During that time they are apt to deteriorate, as by rusting of the attaching face of the steel shoe body, resulting in an imperfect joint. Attempts have been made to improve the joint by employing a cementing layer, such as rubber cement, the solvent of which very quickly evaporates, leaving a tough and usually irregular layer of rubber which prevents proper seating of the lining, so that such cements have been unsatisfactory.

The present invention provides a moisture-retaining, water-soluble cementing layer between the shoe body and friction layer, preferably composed principally of sodium silicate or "water glass," together with a filler of clay or other earthy material, which will flow easily when applied and retain its moisture for a long time. When the shoe is put in service, the lining will properly seat itself on the shoe body or foundation member and the cementing layer will harden by drying out through the frictional braking heat and become very hard according to a well-known property of sodium silicate cements, not previously utilized in friction elements so far as I am aware. A perfect water-tight and oil-proof joint is thereby obtained between the shoe body and the friction facing, and the rivets or other mechanical fastenings are also firmly anchored so that they will not readily work loose.

Of the accompanying drawing,

Fig. 1 is a side elevation of a brake shoe made according to my invention.

Fig. 2 is an enlarged transverse section on the line 2—2 of Fig. 1.

In the drawing, 10 is the metallic brake shoe body or foundation member, of the usual arcuate form and T-shaped cross section, 11 is the outer layer of molded or woven friction material, usually including asbestos and a binder, and 12, 12 are metallic rivets attaching said facing or brake lining to the shoe body, said rivets having their outer heads in countersunk holes 13 in the lining and their stems extending through holes 14 in the parts.

15 is a cementing layer interposed between the shoe body 10 and the friction lining or facing 11 and adapted to surround the rivet stems in the holes 14. This cementing layer is of the nature previously indicated, consisting mainly of a thick water solution of sodium silicate in major proportion, such as two thirds or more, and the remainder mainly an earthy filler, such as a soft clay, the composition being free-flowing and readily spreadable upon the surface to be coated. There are a large number of compositions known in the art of sodium silicate cements, including various kinds of clay fillers or substitutes such as whiting, etc., and adapted to be more or less diluted with water. Most of them will suit the present purpose.

The cementing layer 15 of sodium silicate solution and filler, when placed between the shoe body 10 and the friction lining 11, has the property of retaining its moisture for a long period of time, without drying out until put in service. When the brake shoe is installed and subjected to the heat of braking friction, such heat rapidly expels the moisture from the layer 15, the braking pressure, by reason of the fluent nature of the cementing layer, causes the lining 11 to seat properly against the shoe body 10 and embeds the rivets 12 in the crevices or clearances of the holes 14 surrounding the rivet stems, whereby the cementing layer becomes permanently hardened to effect a perfect bond between the shoe body and lining and effectively anchor the rivets 12 against loosening in service.

The shape of the friction element is not confined to an arcuate form but may be anything usual in brake shoes or clutch plates, and the described details of embodiment could be otherwise varied within the scope of my invention.

I claim:

1. A friction element comprising a metallic foundation member, a facing layer of friction material secured thereto by mechanical fasteners, and an interposed cementing and fastener-anchoring layer of water-soluble, siliceous and earthy filler material which is hardenable by the friction heat of braking.

2. A brake shoe comprising a metallic foundation member, a facing layer of friction material secured thereto by rivets, and an interposed cementing and rivet-anchoring layer of heat-hardening material which is principally sodium silicate.

ARTHUR B. KEMPEL.